United States Patent [19]

Lang

[11] Patent Number: 4,714,983
[45] Date of Patent: Dec. 22, 1987

[54] UNIFORM EMISSION BACKLIGHT

[75] Inventor: Warren R. Lang, Chandler, Ariz.

[73] Assignee: Motorola, Inc., Schaumburg, Ill.

[21] Appl. No.: 743,226

[22] Filed: Jun. 10, 1985

[51] Int. Cl.⁴ ............................................. F21V 13/04
[52] U.S. Cl. ...................................... 362/27; 362/31; 350/345
[58] Field of Search ............... 362/26, 27, 30, 31, 362/310, 246, 329, 800; 350/338, 339, 345

[56] References Cited
U.S. PATENT DOCUMENTS

| | | | |
|---|---|---|---|
| 4,096,550 | 6/1978 | Boller et al. | 362/31 |
| 4,126,383 | 11/1978 | Doriguzzi et al. | 350/345 |
| 4,310,871 | 1/1982 | Adachi | 362/23 |
| 4,487,481 | 12/1984 | Suzawa | 350/345 |
| 4,573,766 | 3/1986 | Bournay, Jr. et al. | 350/345 |

Primary Examiner—William A. Cuchlinski, Jr.
Assistant Examiner—D. M. Cox
Attorney, Agent, or Firm—Lowell W. Gresham

[57] ABSTRACT

A backlight having lamps inserted into ends of a transparent member is disclosed. A top surface of the member is polished and contains an opaque section opposing the lamps. A bottom surface of the member is uniformly frosted so that variations in the average depth of surface irregularities are minimized.

17 Claims, 6 Drawing Figures

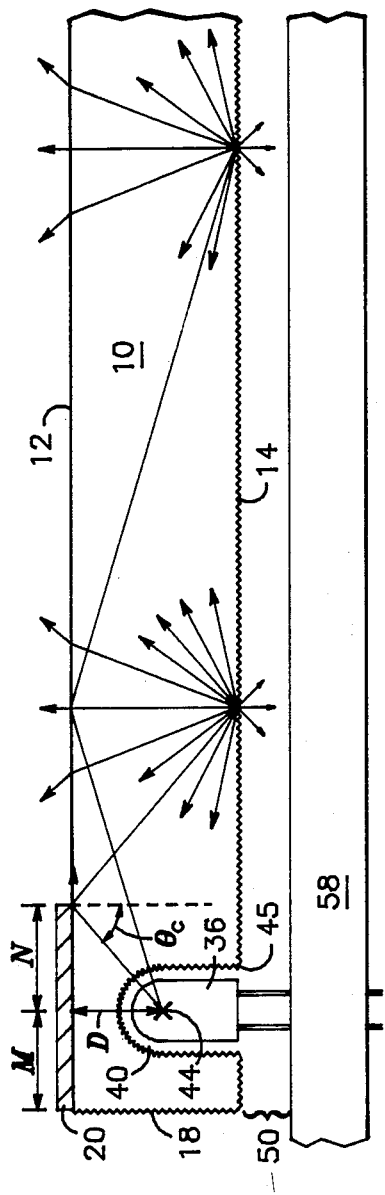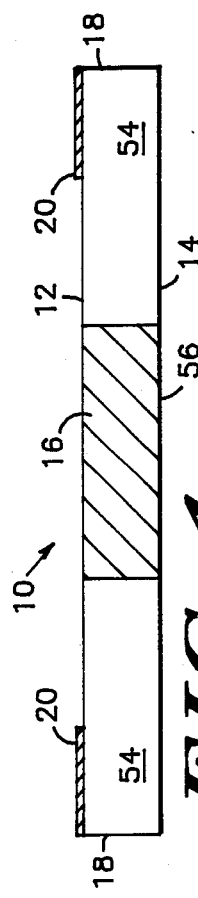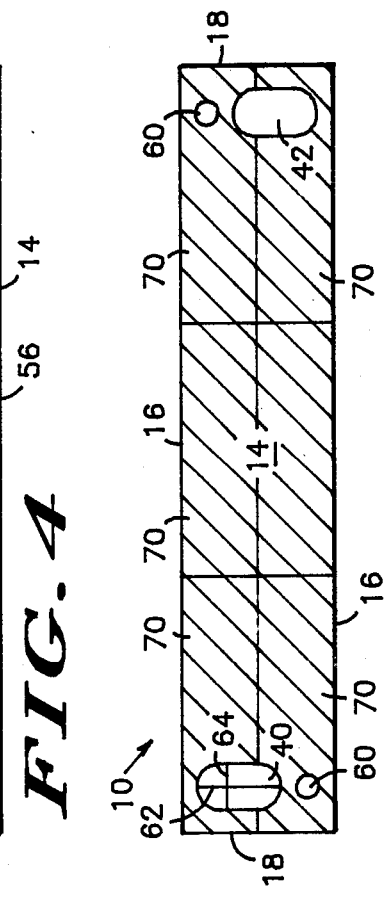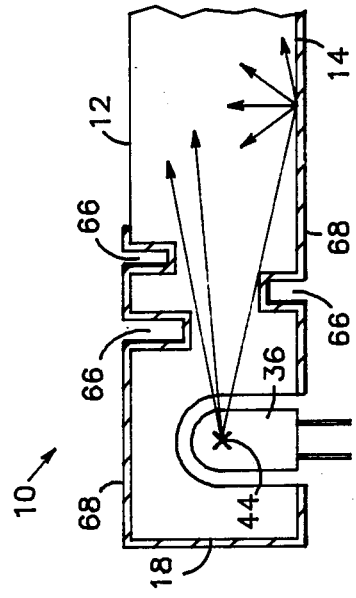
FIG. 3
FIG. 4
FIG. 5
FIG. 6

UNIFORM EMISSION BACKLIGHT

BACKGROUND OF THE INVENTION

This invention relates generally to light emitting devices. Specifically, the present invention concerns devices which emit light uniformly throughout a relatively large area. More specifically, the present invention relates to back lighting devices which may be particularly useful in conjunction with liquid crystal displays and the like.

The present invention provides an improvement in backlighting uniformity. Backlighting uniformity essentially refers to the elimination of hot spots, or areas of higher illumination relative to other areas of illumination. Although various techniques have been used to achieve uniformity, the present invention represents an improvement by using relatively simple devices. Resultingly, an inexpensive backlight can be provided using the teaching of the present invention. Furthermore, the present invention also achieves a uniform backlight without a significant sacrifice in overall illumination intensity. Thus, smaller and lower power lamps may be used to achieve a given level of illumination intensity.

SUMMARY OF THE INVENTION

Accordingly, it is an object of the present invention to provide an improved backlight which emits light throughout a predetermined area.

Another object of the present invention concerns employing a backlighting plate which is relatively simple and inexpensive to produce.

Still another object of the present invention concerns providing a backlight which allows viewing of information displayed on a transflective liquid crystal display in spite of an absence of ambient light.

The above and other objects and advantages of the present invention are carried out in one form by a lamp, a transparent member, and an opaque material. The transparent member has a polished top surface opposing a frosted bottom surface. The transparent member has a cavity into which the lamp is inserted. The opaque material resides on the top surface, opposing the lamp. It covers an area over which light from the lamp could otherwise escape the transparent member without first being reflected from other surfaces of the transparent member or other devices. This area is a function of a critical angle, which characterizes the transparent member, and the distance of the lamp inside the transparent member from the top surface.

BRIEF DESCRIPTION OF THE DRAWINGS

A more complete understanding of the present invention may be derived by reference to the detailed description and claims when considered in connection with the accompanying drawings, wherein:

FIG. 3 shows a partial cross-sectional view of the present invention;

FIG. 4 shows a side view of the present invention;

FIG. 5 shows a bottom view of the present invention; and

FIG. 6 shows a partial cross-sectional view of a second embodiment of the present invention.

DETAILED DESCRIPTION OF THE PREFERRED EMBODIMENT

Figure 1:
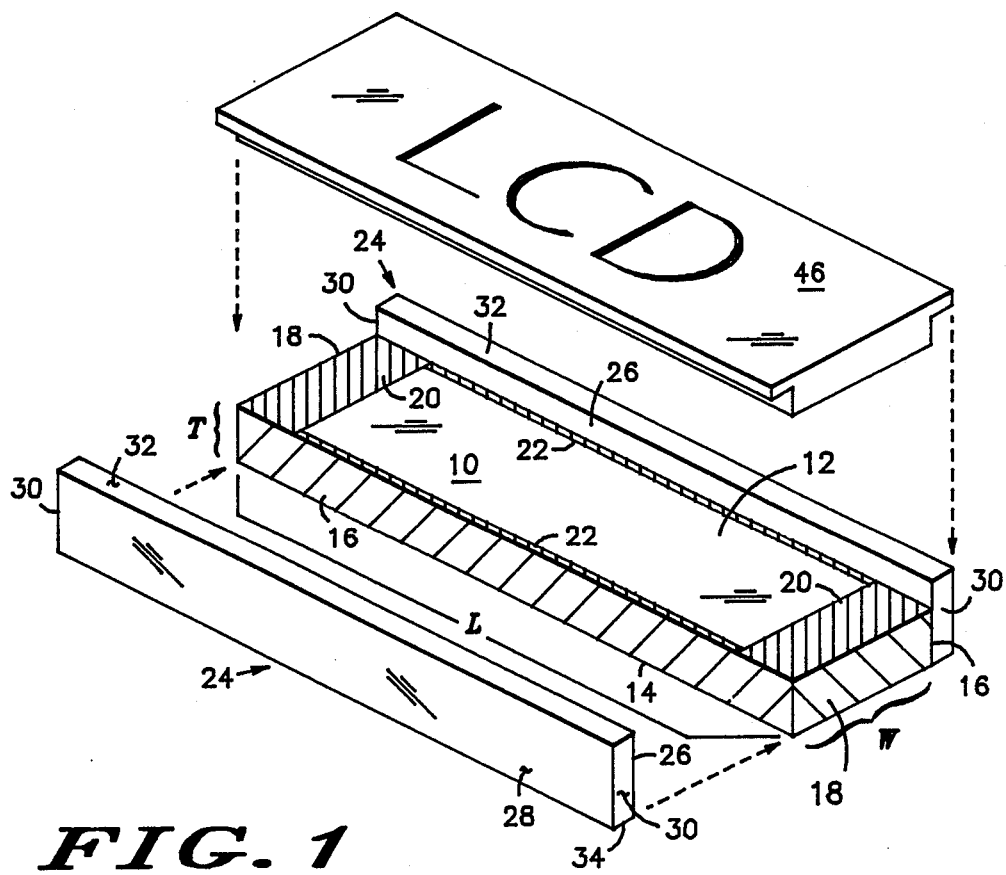
FIG. 1 shows an exploded perspective view of the present invention.

Referring to FIG. 1, the present invention includes a backlight plate 10 which is located under a liquid crystal display (LCD) 46. Additionally, zebra strips 24 reside beside backlight plate 10 and underneath portions of LCD 46.

Backlight plate 10 is an optically clear, transparent member, such as may be obtained through the use of glass or clear acrylic plastics. Backlight plate 10 may be characterized for the purpose of teaching the present invention as having a top surface 12 which faces and is adjacent to LCD 46. When the present invention operates, light is emitted throughout top surface 12. Backlight plate 10 contains a bottom surface 14 which opposes top surface 12, substantially parallels top surface 12, and is spaced apart from top surface 12 by a distance equivalent to a thickness T of backlight plate 10.

Backlight plate 10 also contains opposing ends 18 which substantially parallel each other and are perpendicular to both top surface 12 and bottom surface 14. Ends 18 are separated from each other by a length L of backlight plate 10. Furthermore, backlight plate 10 contains two opposing and substantially parallel sides 16 which seperate top surface 12 from bottom surface 14 and ends 18 from each other. Sides 16 are separated from each other by a distance equivalent to a width W of backlight plate 10.

In a preferred embodiment of the present invention the length L, width W, and thickness T of backlight plate 10 approximate 2.7 inches, 0.6 inches, and 0.2 inches, respectively. Those skilled in the art of backlighting will recognize that the various aspect ratios defined by these dimensions are subject to considerable variation without adversely affecting the uniformity of the resulting backlight. However, a significant reduction in thickness T accompanied by an increase in length L may tend to adversely affect lighting uniformity by preventing the central area of backlight plate 10 from emitting as much light as is emitted from the end sections of backlight plate 10. The term uniformity as used herein refers to the appearance of uniformity as perceived by a human eye. It is well understood that a gradual change in absolute illumination intensity of up to three to one over an illuminated surface may provide an appearance of uniformity.

The material from which backlight plate 10 is constructed typically comes in sheets which have polished top and bottom surfaces. In the present invention top surface 12 of backlight plate 10 remains polished. A polished surface represents a relatively smooth surface from which light can be reflected without significant diffusion. In other words polished surfaces permit specular reflections. The average depth of surface irregularities for a polished surface is substantially less than the wave length of the electro-magnetic energy, such as light, incident to the polished surface. Thus, surface depth irregularities of a surface which is polished to visible light typically remain less than one microinch.

In contrast to polished top surface 12, bottom surface 14, sides 16, and ends 18 of backlight plate 10 in this embodiment of the present invention exhibit frosted surfaces. Frosted surfaces represent relatively rough surfaces compared to the polished surfaces mentioned above. The frosted surfaces diffuse light, or reflect light more or less in all directions. The depth of the surface irregularities of the frosted surfaces may be substantial when compared to the wave lengths characteristic of visible light.

Backlight plate 10 additionally contains end opaque sections 20 and side opaque sections 22 located on top surface 12. End opaque sections 20 block the transmission of light from inside backlight plate 10 in areas where hot spots would otherwise occur. Side opaque sections 22 block the passage of light from backlight plate 10 in areas where it is undesirable for LCD 46 to be illuminated. This embodiment of the present invention utilizes black paint as an opaque material which forms end opaque sections 20 and side opaque sections 22. However, tape or other light blocking materials could be equally effective.

Figure 2:
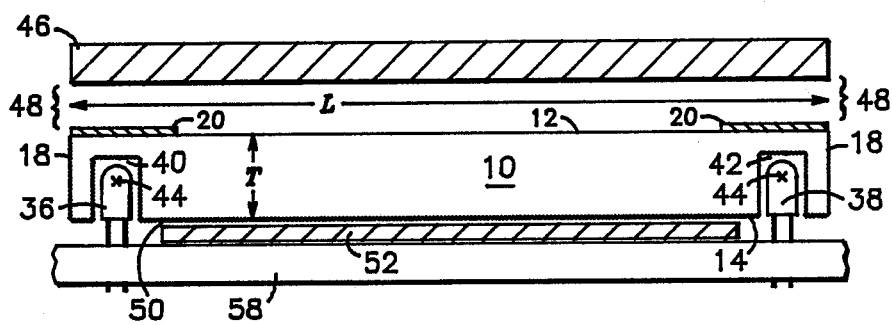
FIG. 2 shows a cross-sectional view of the present invention.

Zebra strips 24 electrically connect LCD 46 to various conductors on a circuit board, such as printed wiring board 58 (see FIGS. 2 and 3). Zebra strips 24 each have an inward side 26 which faces backlight plate 10, and an outward side 28 which parallels inward side 26 and is displaced from inward side 26 away from backlight plate 10. Each of zebra strips 24 also has a top 32 and a bottom 34. Zebra strip top 32 contacts LCD 46 and zebra strip bottom 34 contacts printed wiring board 58 and conductive traces thereon (see FIGS. 2 and 3). Zebra strips 24 contain a multiplicity of isolated electrical conductors extending from tops 32 to bottoms 34. Additionally, zebra strips 24 are slightly compressable. By compressing zebra strips 24 between LCD 46 and printed wiring board 58, good electrical connections are established and maintained. A bezel (not shown) may be used to compress zebra strips 24 and retain LCD 46 relative to zebra strips 24. The bezel may engage the periphery of LCD 46 and be fastened to printed wiring board 58 by screws, or the like.

In the present embodiment inward side 26 of zebra strips 24 represent white, reflective surfaces. Since inward sides 26 of zebra strips 24 reside adjacent to sides 16 of backlight plate 10, the majority of light which escapes from backlight plate 10 at sides 16 reflects away from the white reflective surface of inward sides 26 back into backlight plate 10.

LCD 46 may comprise a transflective liquid crystal display which both transmits and reflects light. Characters displayed in LCD 46 reflect ambient light. Backlighting is not required when ambient light exits which can be reflected by the characters. However, in the absence of ambient light the reflective property of the characters displayed in LCD 46 is of no help. In the absence of ambient light, backlighting which is emitted from backlight plate 10 permits the viewing of characters displayed in LCD 46. The characters in LCD display 46 are essentially opaque whereas all other sections of LCD display 46 are essentially transparent. Thus, backlighting permits the viewing of the LCD 46 characters by providing a lighted background which contrasts with dark characters.

FIG. 2 shows a cross sectional view of the present invention depicting length L and thickness T dimensions of backlight plate 10. A diffuse reflector 52 resides between printed wiring board 58 and backlight plate 10. Diffuse reflector 52 reflects the majority of light incident upon it and scatters the reflected light in many different directions. A white sheet of paper represents one form of diffuse reflector 52.

A first cavity 40 and a second cavity 42 are shown extending inside backlight plate 10 from bottom surface 14. The cross-sectional outline of the cavity resembles a rectangle with all sides either parallel or perpendicular to top surface 12 of backlight plate 10. In this embodiment of the present invention bottom surface 14, ends 18, and walls between cavities 40 and 42 of backlight plate 10 are frosted. Top surface 12 remains polished, and end opaque sections 20 reside on top surface 12 opposing cavities 40 and 42.

Lamps 36 and 38 are energized by power supplied through conductive traces (not shown) on printed wiring board 58. Lamp 36 is inserted into cavity 40, and lamp 38 is inserted into cavity 42. Each of lamps 36 and 38 contain a light source 44 therein. Light source 44 represents the point or small area within lamps 36 and 38 from which light is emitted. In the present embodiment lamps 36 and 38 represent incandescent lamps which emit substantially white light at a relatively high light intensity when compared to light emitted from light emitting diodes (LEDS). However, those skilled in the art will recognize that LEDS may also be used for lamps 36 and 38 and may in fact be preferred when an application calls for a colored backlight such as red, yellow, or green. Additionally, the use of two lamps provides a benefit in backlight reliability. Either one of lamps 36 or 38 may burn out. LCD 46 remains readable, although uniformity of illumination may be reduced.

An air gap, such as gap 50, resides between bottom surface 14 of backlight plate 10 and diffuse reflector 52. Gap 50 permits the frosted bottom surface 14 of backlight plate 10 to effectively diffuse reflected light within backlight plate 10 by insuring that air is present at a boundary of backlight plate 10 which is defined by bottom surface 14. In practice merely placing backlight plate 10 adjacent to diffuse reflector 52 provides a sufficient air gap 50 because of extensive surface irregularities in bottom surface 14 caused by frosting. However, coating bottom surface 14 with oil or paint may degrade the desired diffusion effect from bottom surface 14 and cause hot spots in the resulting backlighting.

FIG. 2 also shows a second air gap 48 between top surface 12 of backlight plate 10 and LCD 46. Air gap 48 further reduces hot spots, and in the present embodiment represents a distance of greater than 0.050 inch.

As known to those skilled in the art, when light encounters a boundary between materials having different densities one portion of the light may be reflected and another portion of the light may be refracted. Furthermore, the denser material may be characterized as having an index of refraction relative to the less dense material. Due to this index of refraction, another parameter called a critical angle ($\theta_c$) also describes relative characteristics of the two materials. When light approaches, or is incident to, a polished surface at an angle greater than the critical angle ($\theta_c$) a phenomenon known as total internal reflection occurs. The critical angle ($\theta_c$) is measured relative to a line perpendicular to the polished surface. When total internal reflection occurs, no light transmits from the more dense material into the less dense material. Instead, all the light incident to the polished surface is reflected within the denser material.

FIG. 3 shows the criteria for establishing end opaque sections 20 on top surface 12 of back light plate 10. This criteria considers the critical angle ($\theta_c$). Thus, end opaque areas 20 substantially cover those areas of top surface 12 from which light may escape backlight plate 10 through refraction at top surface 12 directly from light source 44 without reflecting off some other surface first. Any point on top surface 12, which causes an angle to form between a line perpendicular to top surface 12 at that point and a line through that point and light source 44, that is less than the critical angle ($\theta_c$), is covered by end opaque sections 20.

Lamp 36 is inserted into cavity 40 so that light source 44 resides a distance D below top surface 12. Opaque section 20 extends toward the central area of top surface 12 at least a distance N from a point directly above light source 44. By applying basic trigonometry, the distance N can be calculated as D X TAN ($\theta_c$). If light source 44 is located a distance M from end 18, then end opaque section 20 covers top surface 12 from end 18 inward for a distance greater than M plus N.

The fact that light refracts between air within cavity 40 and the more dense material of backlight plate 10 permits covering a smaller area of top surface 12 with opaque section 20 when cavity 40 has a retangular shaped outline, as shown in FIG. 2. However a circularly ended cavity 40, as shown in FIG. 3, does not permit reduction of the area covered by opaque section 20.

Additionally, frosting on the cavity walls tends to diffuse the light as it enters backlight plate 10 and suggests a larger area of coverage. To insure that light directly radiated from light source 44 remains within backlight plate 10, distance N may alernatively be calculated from point 45, which represents the intersection of the inside wall of cavity 40 and bottom surface 14, rather than from light source 44 as shown in FIG. 3 and described above. However, as a practical matter, a relatively small amount of light directly radiated from light source 44 may be permitted to escape top surface 12 without harming an appearance of uniformity.

In the embodiment shown in FIG. 3, backlight plate 10 directly opposes printed wiring board 58, separated only by air gap 50. Although a diffuse reflector is not inserted, a substantially uniform lighting situation still results because printed wiring board 48 operates moderately well as a diffuse reflector. However, the overall intensity of illumination may be reduced.

A side view of an alternative embodiment of the present invention is shown in FIG. 4. Thus, a side 16 of back light plate 10 is shown between ends 18, and top and bottom surfaces 12 and 14, respectively. End opaque sections 20 are located on top surface 12 as described above. In this embodiment, each of side 16, and the opposing side 16 which is not shown in this view, is divided into two side end sections 54, each of which is adjacent one of ends 18. A side central section 56 exists between the two side end sections 54. Side end sections 54 remain polished, but side central section 56 is frosted. This selective location of a frosted area helps channel light toward the central section of backlight plate 10. Reflections inside backlight plate 10 along side end sections 54 tend to be spectral rather than diffuse. Thus, the majority of light produced by light source 44 (see FIGS. 2 and 3) and reflected off side end sections 54 of side 16 inside backlight plate 10 propagates toward the center of backlight plate 10 rather than being scattered in all directions. The precise size of side end sections 54 and side central section 56 may be determined empirically.

Referring to FIG. 5, a view of bottom surface 14 shows cavities 40 and 42 as having an elongated cross-sectional area characterized by a long diameter 62 and a short diameter 64. Long diameter 62 substantially parallels ends 18 and short diameter 64 substantially parallels sides 16 of backlight plate 10. The elongation of cavities 40 and 42 improves the diffusion of light at the cavity wall compared to a circular cross-sectional cavity because this boundary has a larger surface area from which light is diffused into backlight plate 10.

FIG. 5 additionally shows mounting holes 60 which are used in attaching backlight plate 10 to printed wiring board 58 (see FIGS. 2 and 3) through the use of self-tapping screws (not shown). Of course other mounting methods, such as clamping backlight plate 10 within a bezel or glueing backlight plate 10 to printed wiring board 58 near ends 18 would also suffice in attaching backlight plate 10 to printed wiring board 58.

The frosting in the present invention is uniform over bottom surface 14 of backlight plate 10. The lack of sufficient uniformity in frosting may cause hot spots. Thus, bottom surface 14 of backlight plate 10 may be described as having a multiplicity of imaginary sectors 70 wherein the frosting in any one of sectors 70 is substantially equivalent to the frosting in adjacent sectors 70.

An important parameter in characterizing the frosting on bottom surface 14 is the variation in the depth of surface irregularities on bottom surface 14. Although the absolute depth of irregularities, number of irregularities in each of sectors 70, and the randomness of patterns that are used to produce the irregularities may also characterize the frosting of bottom surface 14, the variation in depth is particularly important in maintaining uniformity of illumination. Accordingly, the present invention achieves an adequately uniform illumination when the variation in the surface depth irregularities of bottom surface 14 is less than 35 microinches. This degree of variation may be obtained through the use of conventional milling techniques. An improved variation in the depth of surface irregularities in bottom surface 14 can be achieved by using 400 grit sandpaper to frost bottom surface 14. An average surface irregularity of approximately 4 to 8 microinches results, and the resulting variation in surface depth irregularity is 4 microinches maximum. An additional method of producing a uniformly frosted bottom surface 14 uses a conventional glass bead honing technique at a pressure of less than 30 pounds per square inch. When backlight plate 10 is constructed from an acrylic plastic, a surface depth irregularity within an approximate range of 19–25 microinches results.

An alternate embodiment of the present invention which does not rely on uniform frosting of bottom surface 14 is shown in FIG. 6. FIG. 6 contains slots 66 cut in top surface 12 and bottom surface 14 of backlight plate 10. The depth of slots 66 from bottom surface 14 and top surface 12 and the distance of slots 66 from light source 44 of lamp 36 are established using trigonometry and by knowing the distance D of light source 44 from top surface 12. In this embodiment the interior of slots 66, the entire bottom surface 14 and ends 18, and the section of top surface 12 between ends 18 and slots 66 are coated with paint 68 to prevent passage of light. Thus, the placement of slots 66 may be manipulated to reduce the light illuminated from top surface 12 near ends 18 without affecting light which travels toward the central area of backlight plate 10.

The foregoing description uses various embodiments to illustrate the present invention. However, those skilled in the art will recognize that changes and modifications may be made in these embodiments without departing from the scope of the present invention. For example, the terms top, bottom, over, and under have been used herein for reference only in teaching the present invention and do not specify a particular orientation relative to a force exerted by gravity. The present invention may operate in any of a number of different orientations. Additionally, displays other than the transflective LCD described herein may benefit from the uniform backlighting provided by the present invention. Furthermore, cavities 40 and 42 described herein need not be elongated in all applications. Those skilled in the art will recognize that mere bore holes will suffice for cavities 40 and 42 in many applications. These and other modifications obvious to those skilled in the art are intended to be included within the scope of this invention.

What is claimed is:

1. An apparatus for providing a source of light emitted throughout a predetermined area, said apparatus comprising:
    a first lamp having a light source therein;
    a transparent member exhibiting a critical angle ($\theta_c$) with respect to air and having a polished top surface relative to an opposing frosted bottom surface, the bottom surface having a boundary substantially with air, said member having a first cavity therein located proximate a first end of said member, said first lamp being inserted into said first cavity so that said first lamp light source resides inside said member at a distance $D_1$ from the top surface; and
    a first opaque section located on said member top surface opposing said member first cavity so that said first opaque section extends toward the central area of said member top surface for a distance greater than $D_1 \times TAN$ ($\theta_c$ from a point opposing the light source.

2. An apparatus as claimed in claim 1 wherein said member additionally has a second cavity therein located proximate a second end of said member, the apparatus additionally comprising:
    a second lamp having a light source therein, said second lamp being inserted into said second cavity so that said second lamp light source resides inside said member at a distance $D_2$ from the top surface; and
    a second opaque section located on said member top surface opposing said second cavity so that said second opaque section extends toward the central area of said member top surface for at least a distance equivalent to $D_2 \times TAN$ ($\theta_c$ from a point opposing the second lamp light source.

3. An apparatus as claimed in claim 2 wherein:
    said member has first and second sides substantially parallel to each other and substantially perpendicular to the top and bottom surfaces; and
    said member first and second sides and first and second ends are frosted relative said member top surface and said member sides and ends having a boundary substantially with air.

4. An apparatus as claimed in claim 2 wherein:
    said member has first and second sides substantially parallel each other and substantially perpendicular to the top and bottom surfaces;
    each of said member first and second sides has first and second end sections relative to a central section; and
    said member first and second ends and the central sections of said first and second sides are frosted relative to said member top surface and end sections of said first and second sides.

5. An apparatus as claimed in claim 1 wherein:
    the bottom surface of said member comprises surface irregularities; and
    the depth of surface irregularities of the bottom surface of said member varies less than 35 microinches.

6. An apparatus as claimed in claim 1 wherein said first opaque section comprises paint, said paint being substantially black in color.

7. An apparatus as claimed in claim 1 wherein the first cavity in said member represents a slot having a long diameter substantially parallel the first end of said member.

8. An apparatus as claimed in claim 1 wherein said member has cavity walls surrounding the first cavity, and the cavity walls are frosted relative to said member top surface.

9. An apparatus as claimed in claim 1 additionally comprising a diffuse reflector having a reflective surface facing and adjacent said member bottom surface, the reflective surface being substantially white in color.

10. A method of uniformly backlighting a display, said method comprising the steps of:
    providing a point light source, a transparent member having opposing top and bottom surfaces and exhibiting a critical angle ($\theta_c$) relative to air, and a display;
    inserting the point light source of said providing step within the transparent member of said providing step;
    frosting the bottom surface of the transparent member so that the depth of surface irregularities of the bottom surface varies less than 35 microinches;
    blocking passage of light at surface points on the top surface where angles formed between lines perpendicular to the top surface at the surface points and lines through the respective surface points and the point light source are less than the critical angle ($\theta_c$);
    installing the display substantially parallel to the top surface and spaced apart from the top surface by a predetermined distance; and
    providing a boundary with a bottom surface comprised substantially of air.

11. A method as claimed in claim 10 wherein the member of said providing step has ends and sides connecting the top and bottom surfaces, and the method additionally comprises the step of frosting the ends and sides of the member.

12. A method as claimed in claim 10 additionally comprising the steps of:
    providing a second point light source;
    inserting the second point light source within the transparent member of said providing step; and
    blocking passage of light at second surface points on the top surface where angles formed between lines perpendicular to the top surface at the second surface points and lines through the respective second surface points and the second point light source are less than the critical angle ($\theta_c$).

13. A method as claimed in claim 10 wherein the member of said providing step has sides and ends connecting the top and bottom surfaces and the method additionally comprises the step of frosting a central section of the sides relative to sections of the sides which are proximate the ends.

14. A method as claimed in claim 10 additionally comprising the step of installing a diffuse reflector facing the bottom surface.

15. A display apparatus having a backlight, said apparatus comprising:
- a transparent plastic member exhibiting a critical angle ($\theta_c$) with respect to air, having opposing and substantially parallel top and bottom surfaces, having opposing and substantially parallel ends, and having first and second cavities through the bottom surface thereof, said member bottom surface, ends, and sides being frosted relative to the top surface, and said member bottom surface being frosted so that surface depth irregularities vary less than 35 microinches;
- a liquid crystal display located substantially parallel to and facing said member top surface and spaced apart from said top surface by a distance of at least 0.050 inch;
- first and second lamps having first and second light sources, respectively, said first and second lamps being located within the first and second cavities of said member so that the light sources of said first and second lamps are each located approximately a distance D away from said member top surface;
- a circuit board located substantially parallel to and facing said member bottom surface;
- first and second reflective strips located substantially parallel to and facing said member first and second sides respectively; and
- first and second opaque sections located on said member top surface extending perpendicularly away from points opposing said first and second lamp light sources, respectively, for distances greater than $D \times TAN (\theta_c)$.

16. An apparatus as claimed in claim 15 additionally comprising a diffuse reflector having a substantially white surface located between said member bottom surface and said circuit board so that said reflector white surface is facing said member bottom surface.

17. An apparatus for providing a source of light emmitted throughout a predetermined area, said apparatus comprising:
- a first lamp having a light source therein;
- a transparent member exhibiting a critical angle ($\theta_c$) with respect to air and having a polished top surface relative to an opposing frosted bottom surface, first and second sides substantially parallel to each other and substantially perpendicular to the top and bottom surfaces wherein each of said member first and second sides has first and second end sections relative to a central section and the central sections of the first and second sides are frosted relative to said member top surface and the end sections of said first and second sides, said member having a first cavity therein located proximate a first end of said member, said first lamp being inserted into said first cavity so that said first lamp light source resides inside said member at a distance $D_1$ from the top surface; and
- a first opaque section located on said member top surface opposing said member first cavity so that said opaque section extends toward the central area of said member top surface for a distance greater than $D_1 \times TAN (\theta_c)$ from a point opposing the light source.

* * * * *